(12) United States Patent
Schwedt et al.

(10) Patent No.: US 12,174,357 B2
(45) Date of Patent: Dec. 24, 2024

(54) APPARATUS AND METHOD FOR LIGHT FIELD MICROSCOPY

(71) Applicant: Carl Zeiss Microscopy GmbH, Jena (DE)

(72) Inventors: Daniel Schwedt, Jena (DE); Tiemo Anhut, Jena (DE)

(73) Assignee: Carl Zeiss Microscopy GmbH, Jena (DE)

(*) Notice: Subject to any disclaimer, the term of this patent is extended or adjusted under 35 U.S.C. 154(b) by 287 days.

(21) Appl. No.: 17/939,398

(22) Filed: Sep. 7, 2022

(65) Prior Publication Data

US 2023/0074006 A1 Mar. 9, 2023

(30) Foreign Application Priority Data

Sep. 7, 2021 (DE) .................. 10 2021 123 130.2

(51) Int. Cl.
*G02B 21/36* (2006.01)
*G02B 21/00* (2006.01)

(52) U.S. Cl.
CPC ..... *G02B 21/0032* (2013.01); *G02B 21/0076* (2013.01); *G02B 21/008* (2013.01)

(58) Field of Classification Search
CPC .......... G01N 1/00; G01N 21/00; G01N 21/01; G01N 2021/0162; G01N 2021/0181;
(Continued)

(56) References Cited

U.S. PATENT DOCUMENTS

| 7,872,796 B2 | 1/2011 | Georgiev |
| 9,658,443 B2 | 5/2017 | Broxton et al. |

(Continued)

FOREIGN PATENT DOCUMENTS

| DE | 10 2015 121 403 A1 | 6/2017 |
| DE | 10 2020 209 889 A1 | 2/2022 |
| DE | 10 2020 213 714 A1 | 5/2022 |

OTHER PUBLICATIONS

Oliver Bimber, et al., Light-Field Microscopy: A Review, J Neurol Neuromedicine (2019) 4(1): 1-6.
(Continued)

*Primary Examiner* — Don K Wong
(74) *Attorney, Agent, or Firm* — Duane Morris LLP

(57) ABSTRACT

An apparatus and method for light field microscopy. The apparatus has a light source for emitting excitation light, an excitation beam path for guiding the excitation light onto and into a sample, a two-dimensionally spatially resolving detector for detecting emission light emitted by the sample as a consequence of the irradiation by the excitation light, and a detection beam path having a microscope objective and a multi-lens array for guiding the emission light onto the two-dimensionally spatially resolving detector. The two-dimensionally spatially resolving detector being arranged in the focal plane of the multi-lens array or in a plane optically conjugate thereto, the excitation beam path being configured to illuminate only a portion of the sample in a field of view of the detection beam path with excitation light, with a device, in particular a scanner, being present for variable positioning of the illuminated portion of the sample in the field of view of the detection beam path and with a variable stop device being present. The variable stop device being configured to restrict an effective field of view of the detection beam path on the basis of the position of the illuminated portion in the field of view. The stop device is an electronic stop device and/or the stop device is arranged in an intermediate image plane of the detection beam path upstream of the multi-lens array.

24 Claims, 5 Drawing Sheets

(58) Field of Classification Search
CPC .......... G01N 21/62; G01N 21/63; G02B 6/00; G02B 6/0003; G02B 6/0001; G02B 2006/0098; G02B 26/00; G02B 26/002; G02B 21/06
See application file for complete search history.

(56) References Cited

U.S. PATENT DOCUMENTS

| | | | |
|---|---|---|---|
| 10,031,325 | B2 | 7/2018 | Anhut et al. |
| 10,509,215 | B2 * | 12/2019 | Shimada .............. G02B 21/367 |
| 2019/0064493 | A1 | 2/2019 | Truong et al. |

OTHER PUBLICATIONS

Manuel Martinez-Corral, et al., Fundamentals of 3D imaging and displays: a tutorial on integral imaging, light-field, and plenoptic systems, Advances in Optics and Photonics (Sep. 2018) vol. 10, No. 3, p. 512-566.

Zhenkun Zhang, et al., Imaging volumetric dynamics at high speed in mouse and zebrafish brain with confocal light field microscopy, Nature Biotechnology (2021) vol. 39: 74-83.

Search Report issued in DE Application No. 10 2021 123 130.2 dated May 18, 2022.

* cited by examiner

APPARATUS AND METHOD FOR LIGHT FIELD MICROSCOPY

RELATED APPLICATIONS

The present application claims priority benefit of German Application No. DE 10 2021 123 130.2 filed on Sep. 7, 2021, the contents of which is incorporated by reference in its entirety.

FIELD OF THE INVENTION

In a first aspect, the invention relates to an apparatus for light field microscopy. In a second aspect, the invention relates to a method for light field.

BACKGROUND OF THE INVENTION

A generic apparatus for the light field microscopy contains at least the following components: a light source for emitting excitation light, an excitation beam path for guiding the excitation light onto and into a sample, a two-dimensionally spatially resolving detector for detecting emission light emitted by the sample as a consequence of the irradiation by the excitation light, and a detection beam path having a microscope objective and a multi-lens array for guiding the emission light onto the two-dimensionally spatially resolving detector. The two-dimensionally spatially resolving detector is arranged in the focal plane of the multi-lens array or in a plane optically conjugate thereto. The excitation beam path is configured to illuminate only a portion of the sample in a field of view of the detection beam path with excitation light. Then, a device, in particular a scanner, is present for variable positioning of the illuminated portion of the sample in the field of view of the detection beam path and a variable stop device is present, the latter being configured to restrict an effective field of view of the detection beam path on the basis of the position of the illuminated portion in the field of view.

At least the following method steps are carried out in a generic method for light field microscopy: Excitation light is guided onto and into a sample via an excitation beam path, and emission light emitted by the sample as a consequence of the irradiation by the excitation light is guided onto a two-dimensionally spatially resolving detector via a detection beam path and is detected by the detector with two-dimensional spatial resolution. In this case, the detection beam path has at least one microscope objective and one multi-lens array and the two-dimensionally spatially resolving detector is arranged in the focal plane of the multi-lens array or in a plane optically conjugate thereto. Then, a three-dimensional image of the sample is reconstructed from the partial images belonging to the individual lenses of the multi-lens array. Only a portion of the sample in a field of view of the detection beam path is illuminated by excitation light, the illuminated portion of the sample being variably positioned in the field of view of the detection beam path and an effective field of view of the detection beam path being restricted on the basis of the position of the illuminated portion in the field of view.

Generic apparatuses and methods are known, for example from U.S. Pat. No. 9,658,443 B2.

Current biomedical research increasingly focuses on the examination of processes in living samples, such as living cells, tissues or organisms, all the way up to the entire animals. In general, these types of samples are three-dimensional structures, and so the processes to be examined also run in three dimensions. This needs volumes to be recorded quickly. A lower optical resolution is often accepted in order to achieve this.

OBJECTS OF THE INVENTION

Light field microscopy, such as shown in the reference to U.S. Pat. No. 9,658,443, within the scope of which an angularly and spatially resolved detection of the signal is rendered possible by means of a lens array in front of the camera sensor, is a method of fast volume imaging much discussed in current research. Within the scope of this description, the camera sensor is also referred to as sensor for short or as two-dimensionally spatially resolving detector. Then, the three-dimensional image representation of the sample can be calculated from the four-dimensional data set (two dimensions of the individual image and two dimensions of the spatial position of the respective lens of the multi-lens array) obtained from a 2-D camera image. An approach which is preferred in microscopy, and which is much more intuitive is given by Fourier light field microscopy (FLFM), U.S. Pat. No. 7,872,796 B2, in which the multi-lens array is arranged in a plane conjugate to the pupil plane of the microscope objective. In this case, real image representations of the sample are present on the camera sensor under different parallactic viewing angles.

The division of the objective pupil using the multi-lens array generates a multiplicity of microscopic imaging systems, which are connected in parallel but each have a reduced numerical aperture (NA) in relation to the microscope objective. By way of example, a multi-lens array with 10×10 lenses generates 100 subsystems with a numerical aperture NA (subsystem)=0.1 NA (objective). The lateral resolution is likewise reduced by a factor of 0.1× but the lateral field of view is substantially maintained. In the example, the depth of field of a subsystem increases by a factor 100× in comparison with the depth of field of the microscope objective with the full aperture, and so structures of the sample from a range of several ten micrometer axial depth are imaged in focus on the sensor. Therefore, FLFM is particularly suitable for fast volume imaging in particular.

On account of this and on account of the actual object of the application, it is to be expected that FLFM is generally used to examine samples whose thickness exceeds the depth of field of the FLFM, and so a signal is also generated in sample regions which can no longer be imaged on the sensor in focus. A measurement and image representation of a defined volume even at greater depths in the brain is decisive for functional imaging of fast neuronal processes in particular.

Under certain circumstances, the achievable image contrast is greatly reduced by the influx of light on the sensor from sample regions which are no longer imaged on the sensor in focus, and depending on the density of the dye introduced into the sample even the visibility of the desired structures may no longer exist. In principle, two solutions are available to prevent this: A reduction of density and/or number of emitters, especially in the out-of-focus region, and/or a suppression of the imaging of the out-of-focus region on the sensor.

The excitation using a light sheet is a known method of reducing the emitters imaged on the sensor. Firstly, said light sheet can be radiated in from the side, U.S. Ser. No. 10/509,215 B2, or the detection objective is also used as illumination objective. The light sheet is then radiated into the sample at an angle to the optical axis, preferably at the edge of the numerical aperture of the microscope objective, and is sequentially scanned over the sample, U.S. Ser. No. 10/031,325 B2. The thickness of the light sheet can be optimized in an advantageous variant in order to set a compromise between image contrast and duration of the complete volume recording, US 2019/0064493 A1.

Zhang, Z., Bai, L., Cong, L. et al. Imaging volumetric dynamics at high speed in mouse and zebrafish brain with confocal light field microscopy. Nat Biotechnol (2020). https://doi.org/10.1038/s41587-020-0628-7, (hereinafter "Zhang et al")-have described an arrangement which blocks an out-of-focus signal from the detection with the camera sensor using broad slit stops. To this end, a slit-stop array is moved through the intermediate image downstream of the lens array of an FLFM in a manner synchronous with the scanner. The stop plane is imaged onto the camera via a dichroic means using a relay optical unit and the light sheet scanner is situated in a pupil plane downstream of the dichroic means, said light sheet scanner steering the light sheet to the central lens of the lens array of the FLFM and scanning the sample through this lens.

The arrangement proposed by Zhang et al. is complicated and complex from a technical point of view. Firstly, it still requires two relay systems downstream of the intermediate image of the microscope and, secondly, the broad slit stops have to be positioned and oriented very precisely with respect to one another since the arrangement thereof in an intermediate image downstream of the lens array has the consequence that each slit stop of each sub-aperture is defined on an individual basis in respect of orientation, positioning and width.

Moreover, the restriction to a stop wheel as used in the case of Zhang et al. takes all flexibility from the microscope. An exchange of the detection objective or a variation in the light sheet thickness would necessitate an exchange of the stop wheel.

An object of the invention can be considered to be the specification of an apparatus and a method of the aforementioned type, which facilitate a simple and flexibly adjustable discrimination of the out-of-focus signal.

According to the invention, this object is achieved by the apparatus having the features of claim 1 and by the method having the features of claim 18.

According to the invention, the apparatus of the type specified above is developed in that the stop device is an electronic stop device and/or in that the stop device is arranged in an intermediate image plane of the detection beam path upstream of the multi-lens array.

According to the invention, the method of the type specified above is developed in that the stop device is an electronic stop device and/or in that the stop device is arranged in an intermediate image plane of the detection beam path upstream of the multi-lens array.

Preferred exemplary embodiments of the apparatus according to the invention and advantageous variants of the method according to the invention are explained below, in particular with reference to the dependent claims and the appended figures.

The apparatus according to the invention is suitable in particular for carrying out the method according to the invention.

In the following description, the term light field microscopy is used both for Fourier light field microscopy and for conventional light field microscopy. To the extent that substantive matter relates to one of these two techniques, this will in each case be indicated in detail. The essential parts of the invention will be explained in the context of Fourier light field microscopy.

The terms light and excitation light are understood to mean electromagnetic radiation. In particular, this may relate to radiation in the visible range, in the infrared range and/or in the UV range. In principle, any source that supplies the electromagnetic radiation in the desired wavelength range with the desired intensity and temporal structure can be used as the light source or light sources. Known components can be used as a matter of principle. In particular, use is made of lasers which may serve to excite the fluorescence of dyes that have been used to prepare a sample or else to excite autofluorescence or light scattering.

Since light field microscopy is a technique for obtaining three-dimensional images of a sample, the excitation light is radiated onto and substantially also into the sample. Therefore, it is substantially partly transparent samples, in particular biological and living biological samples, that are examined.

The term excitation light refers to electromagnetic radiation which generally serves to generate an observable contrast in the sample in any way. There need not necessarily be a physical excitation of parts of the sample to this end. It is sufficient if any type of electromagnetic radiation which can be detected by the two-dimensionally spatially resolving detector for imaging purposes is radiated from the sample volume as a consequence of the irradiation by the excitation light. This radiation coming from the sample as a consequence of impingement by the excitation light is referred to as emission light.

In particular, the emission light can be autofluorescence light or fluorescence light which is emitted by excited dye molecules. It is also possible that only scattered light, and optionally also light transmitted through the sample, is detected as emission light.

The term excitation beam path denotes all light-guiding, light-shaping and/or light-conducting components, for example mirrors, prisms, lenses and light guides, by means of which the excitation light is transferred from the light source into the illuminated portion on and in the sample.

The term detection beam path is understood to mean all light-guiding, light-shaping and/or light-conducting components, for example mirrors, prisms, lenses and light guides, by means of which detection light or emission light coming from the sample is transferred to the two-dimensionally spatially resolving detector.

The components of the excitation beam path and the detection beam path can be based on the modes of action of refraction, reflection and/or diffraction in air and in the respective materials of the individual components.

The term multi-lens array denotes components which have a plurality of lenses with mutually parallel optical axes and which are often arranged in one and the same plane. By way of example, a multi-lens array may have 10×10=100 individual lenses. Multi-lens arrays are known and are used in multi-point laser scanning microscopy, for example.

The two-dimensionally spatially resolving detector is arranged in a focal plane of the multi-lens array or in a plane optically conjugate thereto. This needs the individual lenses of the multi-lens array to have the same focal length.

The illuminated portion of the sample is a three-dimensional portion of the sample volume because the excitation light penetrates into the sample.

The feature of only a portion of the sample in a field of view of the detection beam path being illuminated by excitation light means that it is not the entire field of view, but only a part thereof, which is illuminated. The field of view of the detection beam path is defined by the imaging components of the detection beam path, in particular the microscope objective and further lenses, for example a tube lens, relay lenses, and the lenses of the multi-lens array.

The terms illuminated portion and illuminated region refer in particular to those parts of the illuminated sample volume which are located within a depth of field of the detection beam path.

Known components and solutions can be used for the device for variably positioning the illuminated portion of the sample in the field of view of the detection beam path. In particular, the device can be a scanner which is arranged in a plane conjugate to the back focal plane of the microscope objective, or at least within a certain proximity thereof.

What is decisive for the variable stop device in the detection beam path, present according to the invention, is that an effective field of view is restricted on the basis of the position of the illuminated portion in the field of view. By way of example, the restriction of the field of view can be matched to the control of the device for variably positioning the illuminated portion of the sample, that is to say in particular in coordination with the control of the scanner.

The property of the stop device of being variable can mean, in particular, that the location, the size and/or the shape of the masked region of the field of view can be set in the stop device, on the basis of location, size, and/or portion in the sample illuminated by excitation light.

The term effective field of view of the detection beam path means the region of the field of view which leads to measurement data from the two-dimensionally spatially resolving detector which are relevant to and evaluable for obtaining an image and which are evaluated.

The specification "upstream of the multi-lens array" means that the intermediate image plane and the stop device are upstream of the multi-lens array in the detection beam path in the beam propagation direction. Expressed differently, in the alternative of the invention where the stop device is arranged in an intermediate image plane, the detection light initially passes through the stop device and subsequently strikes the multi-lens array.

The essential concept of the invention can be considered that of only illuminating a portion of the field of view in the sample, scanning this portion over the sample and subsequently restricting the field of view in the detection beam path to the movement of the illuminated portion by means of a suitable stop device.

The essential advantage of the present invention can be considered that of requiring no complex stop device between the multi-lens array and the detector and of consequently achieving the advantageous effects of suppressing out-of-focus light using a structure that has been significantly simplified in comparison with Zhang et al.

Thus, particularly preferred embodiments of the apparatus according to the invention and of the method according to the invention are distinguished in that a region between the multi-lens array and the two-dimensionally spatially resolving detector is free from stops to be moved in coordination with a movement of the illuminated portion.

Expediently, a control and evaluation unit can be present in the apparatus according to the invention for the purposes of controlling the light source, the scanner, the two-dimensionally spatially resolving detector and the stop device and for the purposes of evaluating the measurement data supplied by the two-dimensionally spatially resolving detector.

By way of example, the control and evaluation unit, which may for example be implemented by a PC or a comparable computing device, may also be configured to reconstruct a three-dimensional image of the sample from the measurement data supplied by the two-dimensionally spatially resolving detector.

In principle, it is possible for the multi-lens array to be arranged in the detection beam path in a plane optically conjugate to a focal plane of the microscope objective. In this case, the focal plane of the microscope objective refers to the front focal plane, that is to say the sample-side focal plane, of the microscope objective. This is the arrangement of conventional light field microscopy. However, for the reasons set forth in the introduction, exemplary embodiments in which the multi-lens array is arranged in the detection beam path in a plane optically conjugate to a back focal plane of the microscope objective are preferred. This corresponds to the set up for Fourier light field microscopy.

In a preferred exemplary embodiment, the variable stop device is configured to at least partly mask light originating from non-illuminated regions of the sample or from regions of the sample outside of a depth-of-field region.

In terms of the method, light which originates from non-illuminated regions of the sample or from regions of the sample outside of a depth-of-field region can be at least partly masked accordingly. This masking can be implemented in the detection beam path. However, this is not mandatory as will still be explained in more detail below.

This measure reduces light not belonging to structures in the sample that are imageable in focus and the image quality of the reconstructed images is increased.

In a preferred exemplary embodiment, the variable stop device is configured to restrict the effective field of view on the basis of the shape and size of the illuminated portion in the field of view. This facilitates a more effective reduction of light not belonging to structures in the sample that are imageable in focus.

The stop device can have means for updating masked regions of the field of view on the basis of the position of the illuminated portion in the field of view. This measure also serves the reduction of light not belonging to structures in the sample that are imageable in focus.

The illumination with the excitation light can be an angular illumination in particular. Initially, lower-lying regions in the volume of the sample are also reached using an angular illumination. Then again, the angular illumination can be set such that no volume substantially outside of the depth of field is illuminated in the region of the field of view, and hence these parts of the sample volume cannot contribute to the stray light either.

The illumination with the excitation light can particularly preferably be a light sheet illumination. In particular, the light sheet can be radiated onto the sample using the microscope objective that is also used to observe the sample. In particular, the light sheet can be radiated in at an angle, that is to say a surface normal of the light sheet is inclined by an angle with respect to the optical axis of the microscope objective.

In a preferred exemplary embodiment of the apparatus, the variable stop device can be alternatively or additionally configured to restrict the effective field of view on the basis of the direction of the illumination, in particular on the basis of an angle of inclination of the excitation light with respect to an optical axis. In particular, the optical axis can be the optical axis of the microscope objective.

In the method, the effective field of view is restricted using a variable stop device which may be located in the detection beam path in particular.

In preferred variants of the method according to the invention, the effective field of view is restricted by the variable stop device in the detection beam path, depending on the shape and size of the illuminated portion and/or depending on the direction of the illumination, in particular depending on an angle of inclination of the excitation light with respect to an optical axis.

According to the invention, the stop device can be arranged in an intermediate image plane of the detection beam path.

Within the scope of the invention, the effective field of view can additionally or alternatively be restricted with the aid of variable stops in an intermediate image plane of the detection beam path.

A relay optical unit can be present in the detection beam path for the purposes of providing an intermediate image plane in the detection beam path.

In principle, masking of the respective regions of the field of view can be implemented by mechanical stops. In such an exemplary embodiment of the invention, the stop device has at least one mechanical stop and at least one actuator for displacing the mechanical stop. By way of example, the actuator can be a piezo-actuator.

In further preferred exemplary embodiments, the stop device can be implemented by at least one electronically controllable stop, in particular an LCD array or an SLM (spatial light modulator). The effective field of view of the beam path is implemented by those regions of the LCD array or of the SLM which are set to transmitting or blocking by way of the control.

In a particularly preferred exemplary embodiment of the invention, the control and evaluation device for implementing the stop device is configured to evaluate only those parts of the measurement data from the two-dimensionally spatially resolving detector which belong to the effective field of view.

Thus, the effective field of view is effectively restricted by virtue of only those parts of the measurement data from the two-dimensionally spatially resolving detector which belong to the effective field of view being evaluated.

An essential advantage achieved in these variants is that the number of components in the detection beam path can be reduced to a minimum, improving the quality of the optical image representation. By way of example, no movable components such as variable mechanical stops are necessary. There is just as little need for variable transmitting components such as LCD arrays or SLMs. The variant in which the stop device is implemented by a selective evaluation of the measurement data from the two-dimensionally spatially resolving detector is elegant, uncomplicated and easily variable. This embodiment is moreover advantageous in that the stop structure can also be variably adjusted during the scan over the field of view. By way of example, this may be advantageous if the scanning mirrors are not located exactly in a plane conjugate to the back focal plane (BFP) of the microscope objective. The inclination angle of the light sheet varies on the basis of the scanning position in this case.

In general, even a light sheet excites a signal outside of a depth-of-field region of the detection optical unit. Moreover, stray light may also arise due to the fact that strong laser light is scattered and not sufficiently suppressed by the optical filters. Since the light sheet is moreover focused into the focal plane of the objective, the illumination profile diverges with increasing distance from the focal plane, and so the lateral dimensions of the region illuminated by the light sheet are significantly larger outside of the depth-of-field region than in the focal plane if the light sheet is not perpendicular to the optical axis. Especially this last case is of practical relevance because the generation of a light sheet without the use of the detection objective is hardly possible in optically thick samples, for example the brain of a mouse, and, in particular, under conditions as are present when studying neuronal processes in the brain of living animals.

As a result of the parallactic imaging of the sample volume, focal signal and out-of-focus signal are not necessarily superposed in the partial images, even if this stray light is present in the partial images. However, it is a property of the reconstruction algorithms that the FLFM partial images are displaced relative to one another by characteristic absolute values and incoherently summated, depending on the sample plane to be calculated, and so the out-of-focus signal is superposed on the actually wanted signal in the reconstructed image. In which form stray light is present in the respective partial images depends on the partial image and its relationship with respect to the illumination geometry.

In general, the depth-of-field region of the objective realized in light field microscopy and the Rayleigh length of the light sheet need not be identical. In detail, this depends significantly on the design of the light sheet. Since only a very small portion of the aperture of the microscope objective is used, as a rule, to generate the light sheet, the Rayleigh length can become comparatively large. The change in the thickness of the light sheet then carries virtually no weight in the region of the field of view.

In this context with the aforementioned aspects, a development of the apparatus according to the invention is advantageous, which development is distinguished in that the variable stop device is configured to restrict an effective field of view differently for the various lenses of the multi-lens array on an individual basis, depending on a relative position of the respective lens of the multi-lens arrays in relation to a geometry of the illuminated portion in the volume of the sample.

Preferred embodiment variants of the method according to the invention are characterized in that the measurement data to be evaluated are selected on the basis of the position of the illuminated portion in the field of view and/or on the basis of the shape and size of the illuminated portion and/or on the basis of a direction of the illumination and/or on the basis of a relative position of the respective lenses of the multi-lens array relative to a geometry of the illuminated portion in the volume of the sample.

By way of example, a projection of the illuminated volume in the sample within a depth-of-field region onto a focal plane of the microscope objective can be taken as a measure for the size and shape of the illuminated portion. This projection can be calculated from the optical parameters of the excitation beam path.

BRIEF DESCRIPTION OF THE DRAWINGS

Further features and properties of the present invention are discussed below with reference to the attached drawings, in which.

Figure 1:
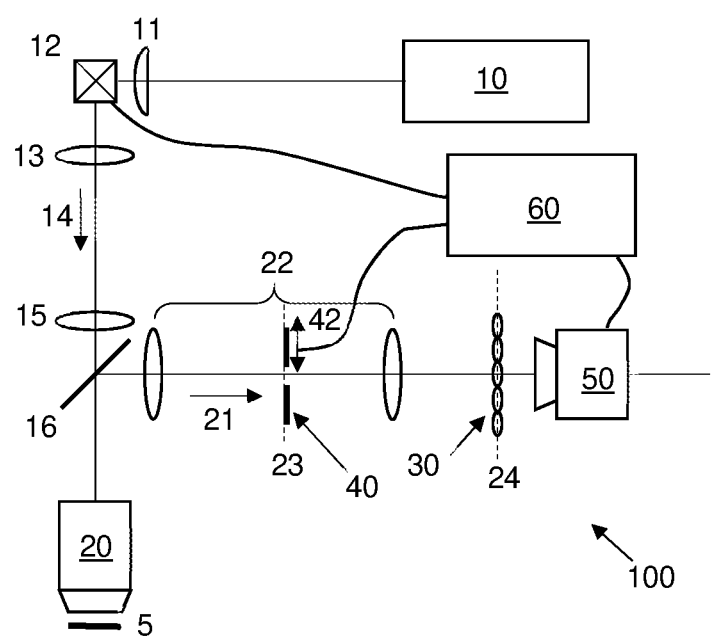
FIG. 1: is a schematic view of an exemplary embodiment of an apparatus according to the invention.

Identical and identically acting components and other constituent parts of the figures are generally identified by the same reference signs in the various figures.

DESCRIPTION OF EMBODIMENTS OF THE INVENTION

An exemplary embodiment of an apparatus for light field microscopy 100 according to the invention will be explained with reference to FIGS. 1 to 4.

As essential components, the apparatus for the light field microscopy 100 has a light source 10, an excitation beam path with a scanner 12, a microscope objective 20, a detection beam path, a multi-lens array 30 and a two-dimensionally spatially resolving detector 50 and a stop device 40.

The light source 10, for example a laser, serves to emit excitation light 14, which is guided via the excitation beam path onto and into a sample 5.

In the example shown, the excitation beam path contains a cylindrical lens 11, the scanner 12, a further lens 13, a tube lens 15, a principal color splitter 16 and the microscope objective 20 in the beam direction of the excitation light 14.

Figure 3:
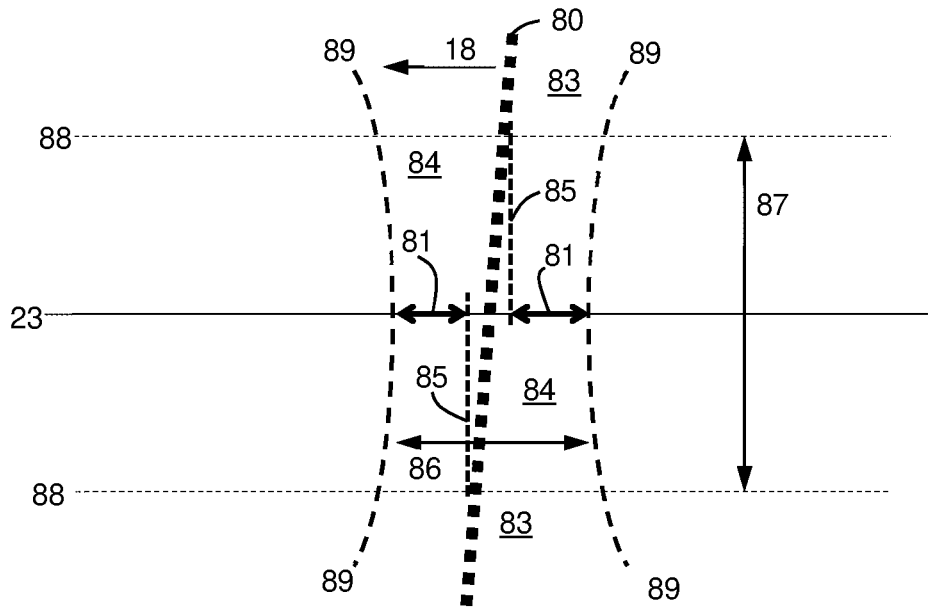
FIG. 3: is a schematic diagram for elucidating regions of the field of view to be masked.
Figure 4:
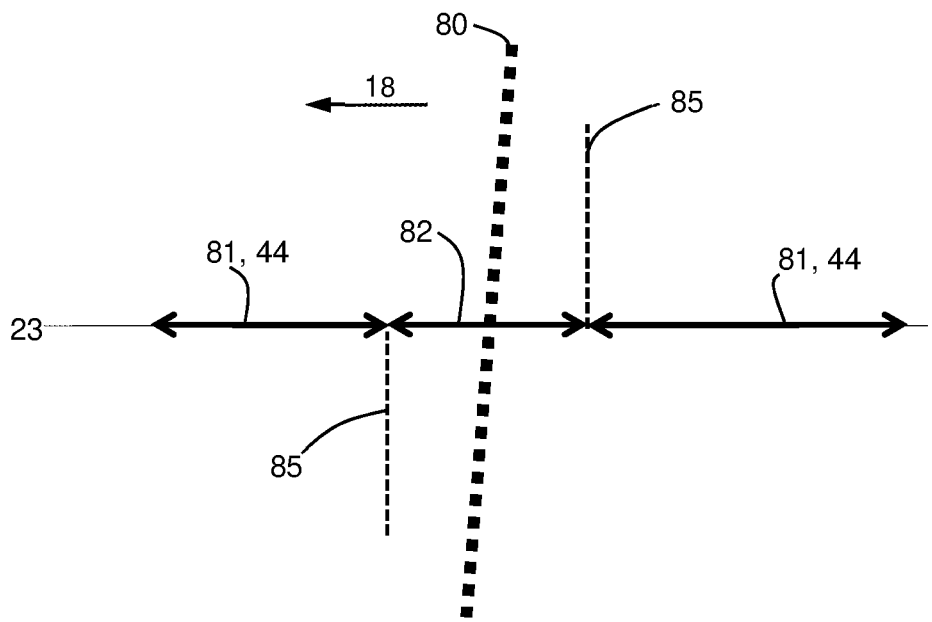
FIG. 4: is an enlarged detail from FIG. 3.
Figure 5:
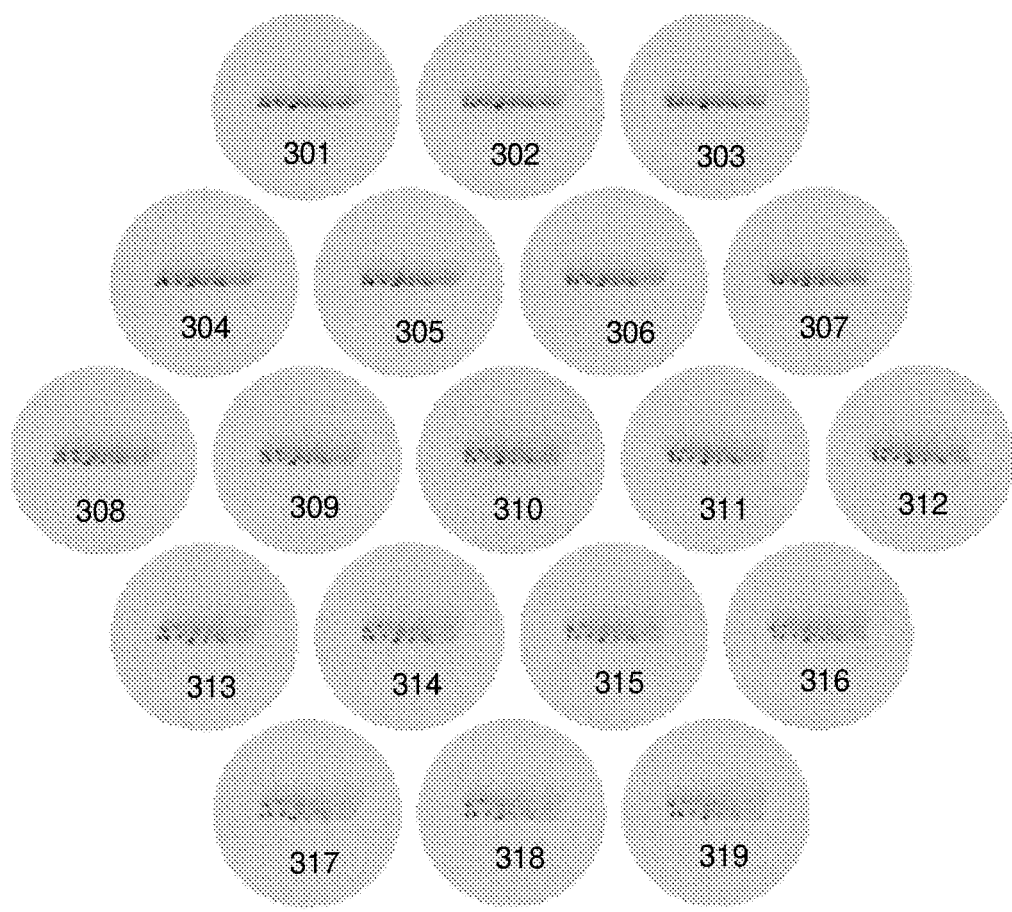
FIG. 5: is an example of images recorded using an apparatus according to the invention.

According to the invention, the excitation beam path is configured to illuminate only a portion 92 of the sample 5 in a field of view 96 of the detection beam path with excitation light 14. In the exemplary embodiment shown, the sample 5 is illuminated at an angle using a light sheet 80, the area of which is inclined at an angle θ with respect to an optical axis 70 of the microscope objective 20 (a surface normal of the light sheet 80 is accordingly inclined by an angle 90°-θ with respect to the optical axis 70 of the microscope objective 20). Further optical components, in particular a cylindrical lens, are present in the excitation beam path for the purposes of providing the light sheet 80, but these are not depicted in FIG. 1. The light sheet 80 is radiated onto and into the sample 5 via the microscope objective 20 in a manner known as a matter of principle, for example as shown in FIGS. 3 to 5 of U.S. Ser. No. 10/031,325 B2.

The scanner 12 implements a device for variably positioning the light sheet 80 (FIG. 2) and hence for variably positioning the illuminated portion 92 of the sample 5 in the field of view 96 of the detection beam path. The scanner 12, which is advantageously arranged in a pupil plane, that is to say in a plane optically conjugate to the back focal plane of the microscope objective 20, can be a galvanometric scanner in the example of FIG. 1.

Emission light 21 coming from the sample reaches the two-dimensionally spatially resolving detector 50 via the detection beam path and can be detected by said detector. In the example shown in FIG. 1, the emission light 21 is fluorescence light which is red shifted in comparison with the excitation light 14 and which can therefore be separated in a manner known per se by means of the principal color splitter. The fluorescence light may originate from dyes used to prepare the sample 5, or it may be autofluorescence light.

In detail, the detection beam path in the example shown in FIG. 1 contains the microscope objective 20, the principal color splitter 16, a relay optical unit 22 having two lenses, the stop device 40, the multi-lens array 30 and, finally, the two-dimensionally spatially resolving detector 50 in the beam direction of the emission light 21.

In the exemplary embodiment of FIG. 1, the two-dimensionally spatially resolving detector 50 is arranged in the focal plane of the multi-lens array 30.

The multi-lens array 30 is arranged in a pupil plane 24, that is to say in a plane which is optically conjugate to a back focal plane of the microscope objective 20. Thus, the arrangement in FIG. 1 is a structure for Fourier light field microscopy, in which real images of the sample are recorded from different parallactic angles using the two-dimensionally spatially resolving detector 50.

Finally, a control and evaluation unit 60, for example a PC, is present for the purposes of controlling the light source 10, the scanner 12, the two-dimensionally spatially resolving detector 50 and the stop device 40 and for the purposes of evaluating the measurement data supplied by the two-dimensionally spatially resolving detector 50. In a manner known per se, the control and evaluation unit 60 serves in particular to reconstruct a three-dimensional image of the sample 5 from the measurement data supplied by the two-dimensionally spatially resolving detector 50.

In the example illustrated in FIG. 1, the stop device 40 is a mechanical stop 44 (FIG. 4) or a plurality of mechanical stops, which is or are variably positionable, as indicated by the double-headed arrow 42, in an intermediate image plane 23 generated by the relay lenses 22. By way of example, a piezo-actuator (not depicted in FIG. 1) may be present for the purposes of positioning the stop 44.

According to the invention, the variable stop device 40 is configured to restrict an effective field of view 82 of the detection beam path on the basis of the position of the illuminated portion 92 in the field of view 96. In the context of the exemplary embodiment in FIG. 1, this means that the position of the stop 44 or the positions of the stops of the stop device 40 is or are controlled by the control and evaluation unit 60.

According to the invention, a region between the multi-lens array 30 and the two-dimensionally spatially resolving detector 50 is free from stops to be moved in coordination with a movement of the illuminated portion 92.

The illumination of the sample 5 is described in detail with reference to FIGS. 2 to 4.

Figure 2:
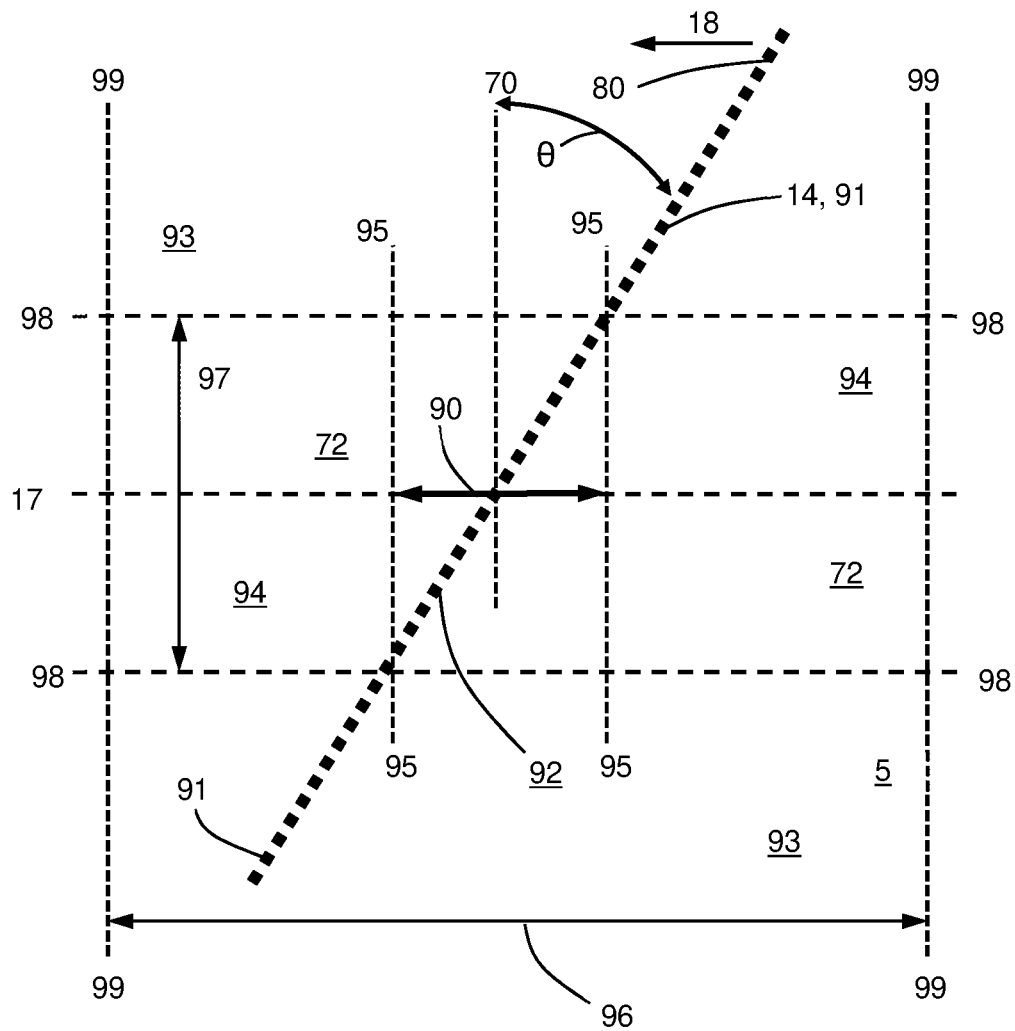
FIG. 2: is a schematic diagram for elucidating the illumination geometry in the sample in the case of an apparatus according to the invention.

FIG. 2 shows the situation in the sample 5 and FIGS. 3 and 4 show the corresponding situation in the intermediate image plane 23, that is to say at the location of the stop device 40.

FIG. 2 schematically shows the light sheet 80, which is radiated into the sample 5 at the angle θ with respect to the optical axis 70 of the microscope objective. In reality, the thickness of the light sheet 80, that is to say its extent in the direction of its surface normal, is not constant as depicted in FIG. 2 but instead the thickness is minimal in the region of a focal plane 17 of the microscope objective 20 and increases with increasing distance from the focal plane 17 in the example shown. However, embodiments in which the change in thickness does not carry weight are also conceivable. With the aid of the scanner 12, the light sheet 80 can be moved through the sample 5 in the direction of the arrow 18. In FIG. 2, the vertical lines 99 are used to schematically represent a field of view 96 of the detection beam path in the sample 5. The illustration in FIG. 2 is schematic inasmuch as the boundaries of the field of view 96 are curved in reality, as depicted more realistically in FIG. 3 for the situation in the region of the intermediate image plane 23 (boundaries 89 of the field of view 86). In FIG. 2, the horizontal lines 98 depict the boundaries of the depth-of-field region 94 with the depth 97 which belongs to a lens of the multi-lens array 30. Thus, the regions 93 of the sample 5 are located outside of this depth-of-field region 94.

The positions for which the light sheet 80 passes through the horizontal delimitations 98 of the depth-of-field region 97 for a defined position of the scanner are depicted by vertical lines 95 in FIG. 2. The portion 92 of the sample illuminated by the light sheet 80 is the portion of the light sheet 80 in the schematic illustration of FIG. 2 which is located within the rectangle delimited by the vertical lines 95 and the horizontal lines 98. Reference sign 91 denotes parts of the light sheet 80 which are located outside of the depth-of-field region 94. Although the light sheet 80 can lead to emission light in these regions 93 of the sample 5, this emission light should preferably be suppressed for the purposes of improving the three-dimensional imaging in accordance with the object of the invention. Finally, regions of the sample 5 that are not illuminated are denoted by reference sign 72. Since these regions 72 are located in the field of view 96 of the detection beam path, scattered light from these regions may reach the detector 50. This scattered light should preferably also be suppressed. Overall, preferably only emission light originating from the volume region of the sample 5 delimited by the vertical lines 95 and the horizontal lines 98 should therefore reach the detector 50. In this case, a projection 90 of the illuminated volume onto the focal plane 17 may serve as a measure for the shape and size of the illuminated portion.

Now, the situation in the intermediate image plane 23 corresponding to the illumination situation in the sample 5 of FIG. 2, that is to say the geometry of the enlarged microscope intermediate image, is depicted in conjunction with FIGS. 3 and 4. In this case, FIG. 4 shows an enlarged portion of a detail in FIG. 3.

In a FIG. 3, the boundaries of the depth-of-field region 87 of the light field detection are depicted symmetrically with respect to the intermediate image plane 23 by the horizontal lines 88 and the region of the field of view 86 is elucidated by the curved and substantially vertical lines 89.

Since the axial magnification changes with the square of the magnification factor of the microscope objective 20, the inclination of the light sheet 80 is not particularly pronounced the intermediate image. Hence, the angle at which the light sheet 80 is incident on the intermediate image plane 23 is more acute than in the sample 5 (FIG. 2).

The light sheet 80 is scanned through the field of view 86 (FOV) in the direction 18.

The volume region in the intermediate image from which light reaches the detector 50 is delimited by the lines 89.

In the context of FIG. 2 it was explained that preferably only emission light originating from the volume region of the sample 5 delimited by the vertical lines 95 and the horizontal lines 98 should reach the detector 50. In FIG. 3 in the region of the intermediate image, this volume region corresponds to the region delimited by the lines 88 and 85. To improve clarity, the lines 85 have only been depicted in truncated fashion in FIG. 3; one has to imagine these lines are continued in such a way that they each intersect both lines 88, like the lines 95 in FIG. 2.

Emission light, which leads to an unwanted background signal in the images of the detector 50, is also created in regions 93 outside of the depth-of-field region 97 (FIG. 2) as a result of the excitation by the light sheet 80. In FIG. 3, the regions 83 of the intermediate image correspond to the regions 93 of the sample.

A first option for masking this contribution to the background signal consists of introducing a variably positionable stop 44 (FIG. 4) at the positions of the arrow 81 in the microscope intermediate image (FIG. 3). This stop 44 acts simultaneously on the images from all lenses of the multi-lens array 30. An important advantage of the solution is that, in contrast to the prior art [6], it is no longer necessary to precisely position and orient various stops. The stop device 40 is implemented by this variably positionable stop 44.

The width of the field of view 82 to be transferred, which is also referred to as effective field of view 82, in other words the aperture of the stop 44, is preferably chosen so that it corresponds to the projection of the illuminated region 92 on the focal plane 17 (FIG. 2). Thus, the variable stop device 40 is configured to restrict the effective field of view 82 on the basis of the shape and size 90 of the illuminated portion 92 in the field of view 96.

The aperture of the stop 44 is guided through the intermediate image synchronously with the movement direction 18 of the light sheet 80 through the sample 5.

However, this requires a fast movement of the stop through the intermediate image, as elucidated by the following numerical example:

Using a 40× microscope objective, a field of view with a lateral extent of 20 mm is reduced to a scanning field with a 355 µm edge length in the object plane. A light sheet 20 µm thick, which is radiated into the sample 5 at an angle of 55° with respect to the optical axis 70, has a width projected onto the focal plane 17 of 34 µm. Accordingly, 11 scanning steps are required to completely scan the scanning field with the light sheet 80. A camera image is recorded within the scope of each scanning step. The scanning field has been scanned after 0.37 s in the case of a refresh rate of the camera of 30 fps. The slit stop has to be moved 20 mm during this time. This corresponds to a speed of 55 mm/s. Corresponding higher speeds are required in the case of faster camera systems.

Preferably, it is also possible to variably set the size of the aperture of the stop 44, firstly to assist an interchange of the microscope objective and secondly to allow the variation of a thickness of the light sheet 80.

In a particularly advantageous variant of the present invention, a purely electronic or software-based stop is used in the intermediate image instead of a mechanical stop or a stop equivalent thereto (LCD, SLM).

By way of example, a rectangular mask with values 1 and 0, which corresponds to the mechanical stop, can be multiplied to the image data for each partial image of a lens of the multi-lens array.

This suppresses an unwanted background signal. Then, an individual mask is assigned to each partial image.

The dependence of the specific mask design on the respectively chosen objective and on the light sheet thickness can be stored in the control and evaluation device 60, for example in tables. Hence, the method and the apparatus are very flexible. Different stop widths, as required for different micro-lenses in each case, also become simpler in their realization as a result.

In accordance with the mechanical entraining of the mechanical stop 44 in the intermediate image plane 23 in a manner synchronized with the scanner 12, the respective mask in this exemplary embodiment must be displaced relative to the image data in synchronized fashion with the scanning of the light sheet 80 over the sample 5. However, since these are only electronic processes, there is no relevant speed restriction in this case.

Moreover, the suppression of the out-of-focus signal can in principle also be implemented during post-processing, and so the image recording need not be impaired or slowed down by this processing. However, it is necessary to ensure that the information about the position of the illuminating light sheet 80, in other words the position of the scanner 12, is available. To this end, it is possible to read the scanner positions and relate the light sheet positions calculated therefrom to the images respectively recorded at this position.

In principle, other illumination geometries are also possible, for example a plurality of the light sheets or a plurality of illumination spots.

FIG. 5 shows a raw data image from an apparatus according to the invention with light sheet illumination, a detection with 19 hexagonally arranged lenses and an electronic implementation of the stop apparatus 40 according to the invention. The image consists of individual images 301 to 319, which each belong to an individual lens of the multi-lens array 30 and which represent an image of the sample 5 from the parallactic viewing angle belonging to the relevant lens. The sample is a brain tissue from a mouse.

Figure 6:
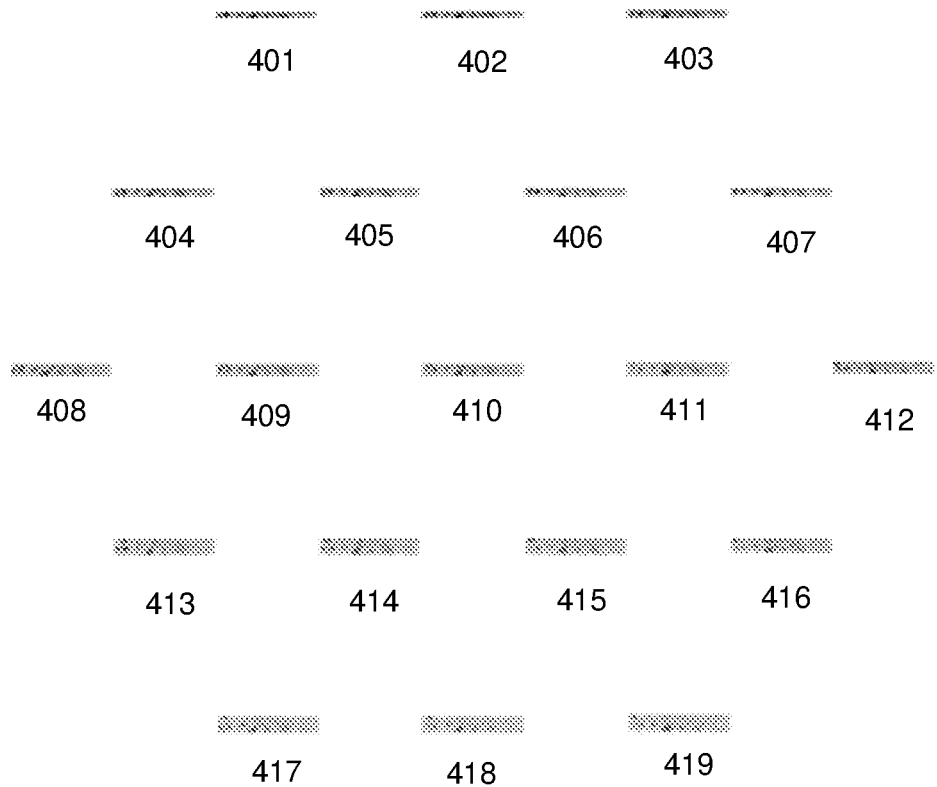
FIG. 6: is the images of the sample from FIG. 5, which were recorded using an apparatus according to the invention with the application of a stop according to the invention.

The image overlaid with an electronically implemented stop according to the invention is depicted in FIG. 6. The effect of the parallactic imaging can be identified in each of the representations of FIGS. 5 and 6. The upper lenses in the multi-lens array, corresponding to images 301 to 307 in FIG. 5 and images 401 to 407 in FIG. 6, see into the sample 5 substantially along the light sheet 80 and hence only a comparatively narrow strip of used signal can be identified in each of these images. Therefore, the mask function for these lenses is implemented by a comparatively narrow strip.

By contrast, the modified viewing angle of the lower lenses, corresponding to images of 313 to 319 in FIG. 5 and images 413 to 419 in FIG. 6, causes the structures to be present distributed over a substantially larger spatial region of the detector 50. Therefore, the mask function is realized by a strip that is increasingly wider in comparison with images 401 to 407. The widths of the electronic stop structures, that is to say the widths of the regions passed by the respective mask function, are therefore chosen on the basis of the position of the sub-aperture for images 401 to 419. The effective field of view 82 is therefore restricted by the variable stop device 40 in the detection beam path, depending on the shape and size 90 of the illuminated portion 92 and depending on the direction of the illumination and, in particular, depending on an angle of inclination θ of the excitation light 14 with respect to the optical axis 70.

Masking the background light advantageously causes significantly fewer interference signals, in particular in the region of the light sheet that is out of focus. This was found to be advantageous, in particular when accumulating all reconstructed images of a light sheet scan. The advantages of the method proposed here increase with stronger scattering, more substantially dyed samples and volume recordings at greater optical depths, for example at more than 100 μm deep in brain tissue.

Possible strip structures in the images following the application of an electronic mask function can be reduced by virtue of using mask functions in which the transition from 0 to 1 is not implemented from one pixel to a directly adjacent pixel but is distributed over a few pixels and a plurality of intermediate steps. Such mask functions also referred to as apodized mask functions.

The present invention provides a novel apparatus and a novel method for light field microscopy, in which the out-of-focus signal and other interfering background signals can be masked, in particular for a light sheet illumination, with reduced apparatus outlay in comparison with the prior art. The quality of the obtained three-dimensional images of the sample can be increased.

While the invention has been illustrated and described in connection with currently preferred embodiments shown and described in detail, it is not intended to be limited to the details shown since various modifications and structural changes may be made without departing in any way from the spirit of the present invention. The embodiments were chosen and described in order to best explain the principles of the invention and practical application to thereby enable a person skilled in the art to best utilize the invention and various embodiments with various modifications as are suited to the particular use contemplated.

UTILIZED REFERENCE SIGNS AND ABBREVIATIONS

5 Sample
10 Light source, laser
11 Cylindrical lens
12 Scanner
13 Lens
14 Excitation light
15 Tube lens
16 Principal color splitter, dichroic beam splitter
17 Sample plane, optically conjugate to the detector plane
18 Scanning direction
20 Microscope objective
21 Emission light
22 Relay optical unit
23 Intermediate image plane
24 Pupil plane
30 Multi-lens array
40 Stop device
42 Movement direction of the field stop 40
44 Stop, in particular mechanical stop
50 Detector, camera
60 Control and evaluation unit
72 Non-illuminated regions of the sample 5
80 Light sheet
81 Regions of the field of view to be masked
82 Part of the field of view to be transferred
83 Region outside of the depth of field
84 Region of the depth of field in the intermediate image
85 Lateral boundaries of the part of the field of view to be transferred
86 Lateral extent of the field of view
88 Delimitations of the depth-of-field region
89 Lateral boundaries of the field of view 86
90 Projection of the illuminated region 92 on to the focal plane 17
91 Illuminated region of the sample 5 outside of the region of the depth of
field
92 Illuminated three-dimensional portion of the sample 5 within the region 94
of the depth of field
93 Region of the sample 5 outside of the depth of field 94
94 Region of the depth of field
95 Boundaries in the sample 5, to which the field of view is intended to be
restricted
96 Extent of the field of view (schematic) in the sample 5
97 Extent of the region of the depth of field in the sample 5

98 Delimitations of the region of the depth of field in the sample 5
99 Lateral delimitations of the field of view (schematic) in the sample 5
100 Apparatus according to the invention
301-319 Images, in each case from an individual lens of the multi-lens array 30
401-419 Images, in each case from an individual lens of the multi-lens array 30 when the effective field of view is delimited by the electronically implemented stop according to the invention
FLFM Fourier light field microscope, Fourier light field microscopy
LCD Liquid crystal device
LFM Light field microscope, light field microscopy
NA Numerical aperture
NA (sub-system) Numerical aperture of the detection beam path in relation to a lens of the multi-lens array
NA (objective) Numerical aperture of the microscope objective
SLM Spatial light modulator

What is claimed is:

1. An apparatus for light field microscopy, comprising
a light source for emitting excitation light,
an excitation beam path for guiding the excitation light (14) onto and into a sample,
a two-dimensionally spatially resolving detector for detecting emission light emitted by the sample as a consequence of the irradiation by the excitation light, and
a detection beam path having a microscope objective and a multi-lens array for guiding the emission light onto the two-dimensionally spatially resolving detector,
the two-dimensionally spatially resolving detector being arranged in the focal plane of the multi-lens array or in a plane optically conjugate thereto,
the excitation beam path being configured to illuminate only a portion of the sample in a field of view of the detection beam path with excitation light,
with a device, in particular a scanner, being present for variable positioning of the illuminated portion of the sample in the field of view of the detection beam path and
with a variable stop device being present, the latter being configured to restrict an effective field of view of the detection beam path on the basis of the position of the illuminated portion in the field of view,
wherein the stop device is an electronic stop device and/or the stop device is arranged in an intermediate image plane of the detection beam path upstream of the multi-lens array.

2. The apparatus as claimed in claim 1,
wherein
a control and evaluation unit is present for the purposes of controlling the light source, the scanner, the two-dimensionally spatially resolving detector and the stop device and for the purposes of evaluating the measurement data supplied by the two-dimensionally spatially resolving detector.

3. The apparatus as claimed in claim 1,
wherein
the control and evaluation unit is configured to reconstruct a three-dimensional image of the sample from the measurement data supplied by the two-dimensionally spatially resolving detector.

4. The apparatus as claimed in claim 1,
wherein
the multi-lens array is arranged in the detection beam path in a plane optically conjugate to a back focal plane of the microscope objective.

5. The apparatus as claimed in claim 1,
wherein
the variable stop device is configured to at least partly mask light which originates from non-illuminated regions of the sample or from regions of the sample outside of a depth-of-field region.

6. The apparatus as claimed in claim 1,
wherein
the variable stop device is configured to restrict the effective field of view on the basis of the shape and size of the illuminated portion in the field of view.

7. The apparatus as claimed in claim 1,
wherein
the stop device has means for updating masked regions of the field of view on the basis of the position of the illuminated portion in the field of view.

8. The apparatus as claimed in claim 1,
wherein
the illumination is an angular illumination.

9. The apparatus as claimed in claim 1,
wherein
the illumination is a light sheet illumination.

10. The apparatus as claimed in claim 9,
wherein
a light sheet is radiated onto the sample using the microscope objective that is also used to observe the sample.

11. The apparatus as claimed in claim 1,
wherein
a surface normal of the light sheet is inclined by an angle (90°-θ) with respect to the optical axis of the microscope objective.

12. The apparatus as claimed in claim 1,
wherein
the variable stop device is configured to restrict the effective field of view on the basis of the direction of the illumination, in particular on the basis of an angle of inclination of the excitation light with respect to an optical axis.

13. The apparatus as claimed in claim 1,
wherein
the stop device has at least one electronically controllable stop, in particular an LCD array or an SLM.

14. The apparatus as claimed in claim 13,
wherein
the stop device has at least one LCD array or one SLM.

15. The apparatus as claimed in claim 1,
wherein
the stop device has at least one mechanical stop and at least one actuator for displacing the mechanical stop.

16. The apparatus as claimed in claim 1,
wherein
the control and evaluation device, for the purposes of implementing the stop device, is configured
to evaluate only those parts of the measurement data from the two-dimensionally spatially resolving detector which belong to the effective field of view.

17. The apparatus as claimed in claim 1,
wherein
the variable stop device is configured to restrict an effective field of view differently for the various lenses of the multi-lens array on an individual basis, depending on a relative position of the respective lenses of the multi-lens arrays in relation to a geometry of the illuminated portion in the volume of the sample.

18. The apparatus as claimed in claim 1,
wherein
a region between the multi-lens array and the two-dimensionally spatially resolving detector is free from stops to be moved in coordination with a movement of the illuminated portion.

19. A method for light field microscopy,
in which excitation light is guided onto and into a sample via an excitation beam path,
in which emission light emitted by the sample as a consequence of the irradiation by the excitation light is guided onto a two-dimensionally spatially resolving detector via an detection beam path and is detected by the detector with two-dimensional spatial resolution, the detection beam path having at least one microscope objective and one multi-lens array and the two-dimensionally spatially resolving detector being arranged in the focal plane of the multi-lens array or in a plane optically conjugate thereto, and
in which a three-dimensional image of the sample is reconstructed from the partial images belonging to the individual lenses of the multi-lens array, with only a portion of the sample in a field of view of the detection beam path being illuminated by excitation light,
the illuminated portion of the sample being variably positioned in the field of view of the detection beam path and
a variable stop device being used to restrict an effective field of view of the detection beam path on the basis of the position of the illuminated portion in the field of view,
wherein
the stop device is an electronic stop device and/or
the stop device is arranged in an intermediate image plane of the detection beam path upstream of the multi-lens array.

20. The method as claimed in claim 19,
wherein
light which originates from non-illuminated regions of the sample or from regions of the sample outside of a depth-of-field region is at least partly masked in the detection beam path.

21. The method as claimed in claim 19,
wherein
the effective field of view is restricted by the variable stop device in the detection beam path, depending on
the shape and size of the illuminated portion and/or
the direction of the illumination, in particular depending on an angle of inclination of the excitation light with respect to an optical axis.

22. The method as claimed in claim 19,
wherein
the effective field of view is restricted by virtue of only those parts of the measurement data from the two-dimensionally spatially resolving detector which belong to the effective field of view being evaluated.

23. The method as claimed in claim 22,
wherein
the measurement data to be evaluated are selected on the basis of
the position of the illuminated portion in the field of view and/or
the shape and size of the illuminated portion and/or
a direction of the illumination and/or
a relative position of the respective lenses of the multi-lens array relative to a geometry of the illuminated portion in the volume of the sample.

24. The method as claimed in claim 19,
wherein
a projection of the illuminated volume in the sample within a depth-of-field region onto a focal plane of the microscope objective in the sample is taken as a measure for the size and shape of the illuminated portion.

* * * * *